F. G. L. STRUVE.
Feed Rack.
No. 34,793.
Patented March 25, 1862.
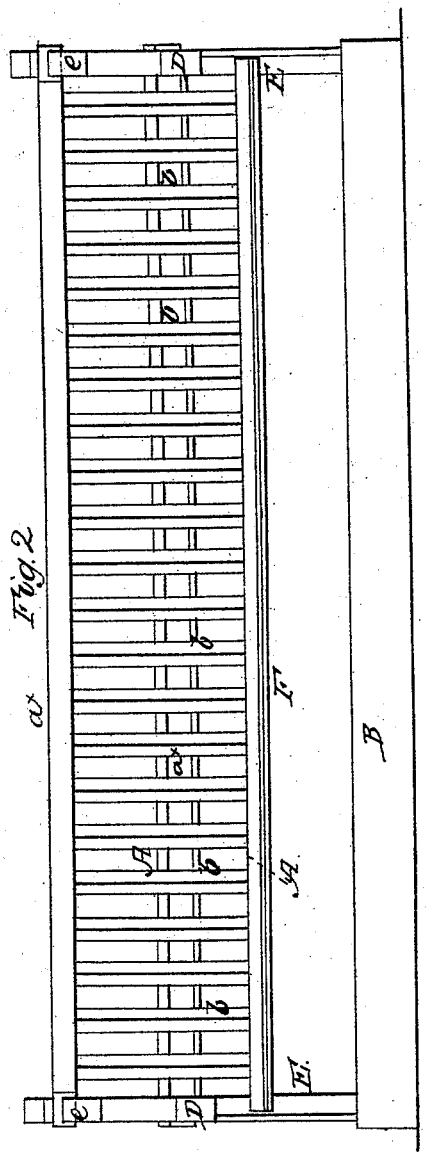
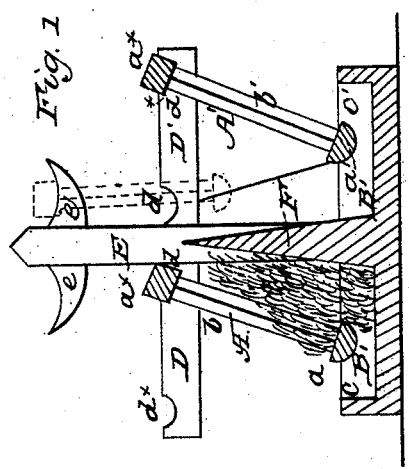

UNITED STATES PATENT OFFICE.

F. G. L. STRUVE, OF JEFFERSON, WISCONSIN.

IMPROVEMENT IN FEED-RACKS.

Specification forming part of Letters Patent No. 34,793, dated March 25, 1862.

*To all whom it may concern:*

Be it known that I, F. G. L. STRUVE, of Jefferson, in the county of Jefferson and State of Wisconsin, have invented a new and Improved Adjustable Rack; and I do hereby declare that the following is a full, clear, and exact description of the same, reference being had to the accompanying drawings, forming part of this specification, in which—

Figure 1 represents a transverse vertical section of my invention, showing the two sides of a double rack in different positions. Fig. 2 is a front elevation of the same, the rack on one side being elevated so as to give free access to the trough.

Similar letters of reference in both views denote like parts.

This invention consists in the arrangement of notched arms or catches in combination with a movable rack in such a manner that said rack, when it is to be filled, can be inclined forward, and that the same after it has been filled can be inclined backward, thereby preventing seed and chaff from dropping down on the animals partaking of the hay or other food contained in it.

To enable others skilled in the art to fully understand and use my invention, I will proceed to describe the construction and operation of a double rack, and from this description it will be apparent that my invention is equally applicable to double and to single racks.

The racks A A' are constructed of two longitudinal beams $a$ $a^*$ $a'$ $a'^*$ and cross-rods $b$ $b'$ in the ordinary manner. The ends of the longitudinal beams are rounded, and those of the lower beams $a$ $a'$ rest in semicircular notches cut into the edges of strips $c$ $c'$, that are firmly secured to the ends of the troughs B B'. The ends of the upper beams $a^*$ $a'^*$ rest in semicircular notches $d$ $d^*$ $d'$ $d'^*$, that are cut into the upper edges of arms D D', as clearly shown in Fig. 1 of the drawings. These arms are rigidly attached to standards E, that rise from the ends of the troughs B B', and the two troughs are divided from each other by the triangular partition F. From the upper ends of the standards E hooks $e$ $e'$ extend in a direction parallel to the arms D D', and from these hooks either one or both racks can be suspended when it is desired to give the animals free access to the trough or troughs.

The operation is as follows: For the purpose of filling the rack, it is turned out to the position shown at A', Fig. 1, the ends of the longitudinal beam $a'^*$ being inserted into the notches $d'^*$, and after sufficient hay or other food has been introduced the rack is turned back to a position shown at A, Fig. 1, the ends of the longitudinal beam $a^*$ being retained by the semicircular notches $d$. By this arrangement the seed and chaff, which with ordinary racks is liable to drop down upon the animals eating of the food in said racks, is retained in the trough B and the animals are kept perfectly clean. After all the food has been consumed, the rack is raised up and suspended from the hooks $e$, and the animals have now free access to the trough for the purpose of consuming the seed and other small particles remaining in the same.

This invention is of peculiar value to wool-growers, since by its use the fleeces of the sheep are kept free from seed and chaff, and the cleaning of the wool is considerably facilitated.

It is obvious that my invention is equally applicable to single and double racks, and also that, instead of the notched arms D D', other devices for retaining the racks in the desired position might be used, such as hooks and eyes or catches of any other description. All such devices I consider mechanical equivalents of the notched arms described and represented in the drawings.

Having thus fully described my invention, what I claim as new, and desire to secure by Letters Patent, is—

The arrangement of the notched arms D D' or their equivalents, in combination with the movable rack or racks A A', constructed and operating substantially in the manner and for the purpose herein shown and described.

F. G. L. STRUVE.

Witnesses:
I. W. BIRD,
D. OSTRANDER.